United States Patent
Bell

(12) 
(10) Patent No.: US 9,718,177 B1
(45) Date of Patent: Aug. 1, 2017

(54) GASKET REMOVAL AND INSERTION TOOLS FOR REFRIGERATION HOSES

(71) Applicant: Charles Bell, Rowlett, TX (US)

(72) Inventor: Charles Bell, Rowlett, TX (US)

(*) Notice: Subject to any disclaimer, the term of this patent is extended or adjusted under 35 U.S.C. 154(b) by 143 days.

(21) Appl. No.: 14/734,284

(22) Filed: Jun. 9, 2015

Related U.S. Application Data

(60) Provisional application No. 62/017,360, filed on Jun. 26, 2014.

(51) Int. Cl.

| | |
|---|---|
| *B25B 1/24* | (2006.01) |
| *B25B 27/00* | (2006.01) |
| *B25B 27/20* | (2006.01) |
| *B25B 25/00* | (2006.01) |
| *F16L 55/17* | (2006.01) |
| *B25B 27/28* | (2006.01) |
| *B25B 27/02* | (2006.01) |
| *B25B 27/06* | (2006.01) |
| *B25B 27/26* | (2006.01) |
| *B25B 1/10* | (2006.01) |
| *B25B 27/24* | (2006.01) |

(52) U.S. Cl.
CPC .......... *B25B 27/0028* (2013.01); *B25B 1/103* (2013.01); *B25B 25/005* (2013.01); *B25B 27/00* (2013.01); *B25B 27/023* (2013.01); *B25B 27/06* (2013.01); *B25B 27/20* (2013.01); *B25B 27/26* (2013.01); *B25B 27/28* (2013.01); *F16L 55/1705* (2013.01); *B25B 27/24* (2013.01)

(58) Field of Classification Search
USPC .......................................... 269/270
See application file for complete search history.

(56) References Cited

U.S. PATENT DOCUMENTS

| | | | | |
|---|---|---|---|---|
| 1,344,700 | A * | 6/1920 | Loomis | B24B 13/0055 24/569 |
| 1,430,373 | A * | 9/1922 | Hennings | B26F 1/3846 144/23 |
| 2,046,759 | A * | 7/1936 | Wheaton | F16K 47/023 251/259 |
| 2,144,427 | A * | 1/1939 | Longstreet | F16K 31/602 251/321 |
| 2,698,550 | A * | 1/1955 | Hill | D07B 7/162 269/103 |
| 2,716,282 | A * | 8/1955 | Kromsten | B23B 51/05 30/310 |
| 2,823,566 | A * | 2/1958 | Bachli | B25B 1/125 269/208 |
| 2,890,042 | A * | 6/1959 | Clemensen | F16L 1/10 269/127 |

(Continued)

*Primary Examiner* — Larry E Waggle, Jr.
*Assistant Examiner* — Alvin Grant
(74) *Attorney, Agent, or Firm* — Plager Schack LLP

(57) ABSTRACT

Some embodiments of the present disclosure include a tool set for the installation and removal of a gasket from a hose. The tool set may include a gasket insertion tool configured to install a gasket on a hose, the gasket insertion tool being self-centering and having a plunger foot configured to install the gasket onto the hose. The tool set may also include a gasket removal tool configured to remove a gasket from a hose, the gasket removal tool being self-centering and including at least one blade configured to grab onto the gasket to remove the gasket from the hose.

4 Claims, 4 Drawing Sheets

(56) References Cited

U.S. PATENT DOCUMENTS

| | | | | |
|---|---|---|---|---|
| 2,902,526 A * | 9/1959 | Gallier | F01M 1/26 | 123/146.5 R |
| 3,088,485 A * | 5/1963 | Hanssen | G05D 9/04 | 137/413 |
| 3,791,588 A * | 2/1974 | Buzzi | E03C 1/06 | 239/446 |
| 4,583,724 A * | 4/1986 | Huang | B25B 1/20 | 269/182 |
| 4,766,755 A * | 8/1988 | Allen | B44D 3/006 | 134/136 |
| 4,785,694 A * | 11/1988 | Burmester | B25B 7/00 | 29/235 |
| 4,804,212 A * | 2/1989 | Vyse | B21D 39/04 | 285/256 |
| 4,820,148 A * | 4/1989 | Anderson | B29C 73/025 | 156/382 |
| 5,022,636 A * | 6/1991 | Swann | B25B 1/103 | 269/154 |
| 5,172,895 A * | 12/1992 | Klimach | B25B 1/103 | 269/253 |
| 5,199,751 A * | 4/1993 | Beagle | F16L 33/2076 | 285/256 |
| 5,782,270 A * | 7/1998 | Goett | H01R 9/0521 | 138/109 |
| 5,893,551 A * | 4/1999 | Cousins | B25B 1/103 | 269/136 |
| 6,370,985 B1 * | 4/2002 | Wu | B25B 25/005 | 29/229 |
| 6,409,161 B1 * | 6/2002 | Wolff | B25B 1/18 | 269/134 |
| 6,431,534 B1 * | 8/2002 | Orosz | B25B 5/101 | 269/249 |
| 6,640,666 B2 * | 11/2003 | Pliley | B25B 1/2405 | 269/283 |
| 7,013,771 B2 * | 3/2006 | Wu | B25B 25/005 | 81/3.27 |
| 7,104,162 B1 * | 9/2006 | Wu | B25B 25/005 | 81/3.07 |
| 7,163,201 B2 * | 1/2007 | Bernstein | B25B 1/103 | 269/32 |
| 7,249,551 B1 * | 7/2007 | Ray | B26D 5/10 | 30/178 |
| 7,316,426 B2 * | 1/2008 | Rader | F16L 13/141 | 285/242 |
| 7,624,504 B2 * | 12/2009 | Watanabe | F16L 33/2073 | 285/256 |
| 7,722,608 B2 * | 5/2010 | Steiner | A61F 2/4644 | 269/54.1 |
| 7,845,607 B2 * | 12/2010 | Matthiessen | B23Q 1/28 | 248/229.12 |
| 7,946,629 B2 * | 5/2011 | Conley | F16L 13/143 | 285/242 |
| 8,888,139 B2 * | 11/2014 | Hunter | F16L 33/2076 | 285/222.5 |
| 2002/0005609 A1 * | 1/2002 | Mattox | B25B 1/125 | 269/244 |
| 2007/0227309 A1 * | 10/2007 | Teeters | B25B 15/02 | 81/9.3 |
| 2008/0271576 A1 * | 11/2008 | Hsieh | B25B 13/06 | 81/121.1 |
| 2012/0169000 A1 * | 7/2012 | Lin | B25B 1/24 | 269/216 |
| 2014/0021667 A1 * | 1/2014 | Wang | B25B 1/103 | 269/20 |

* cited by examiner

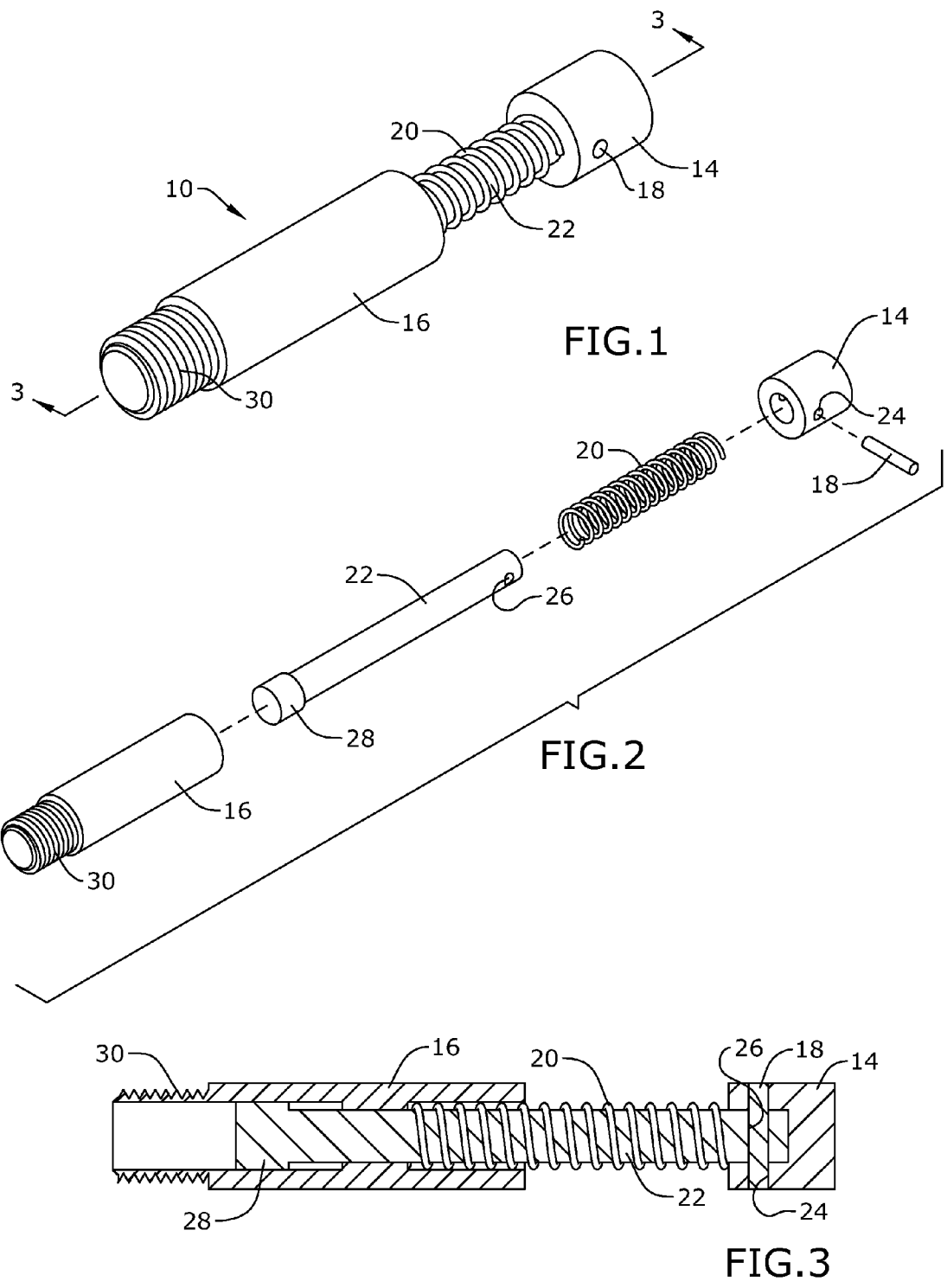

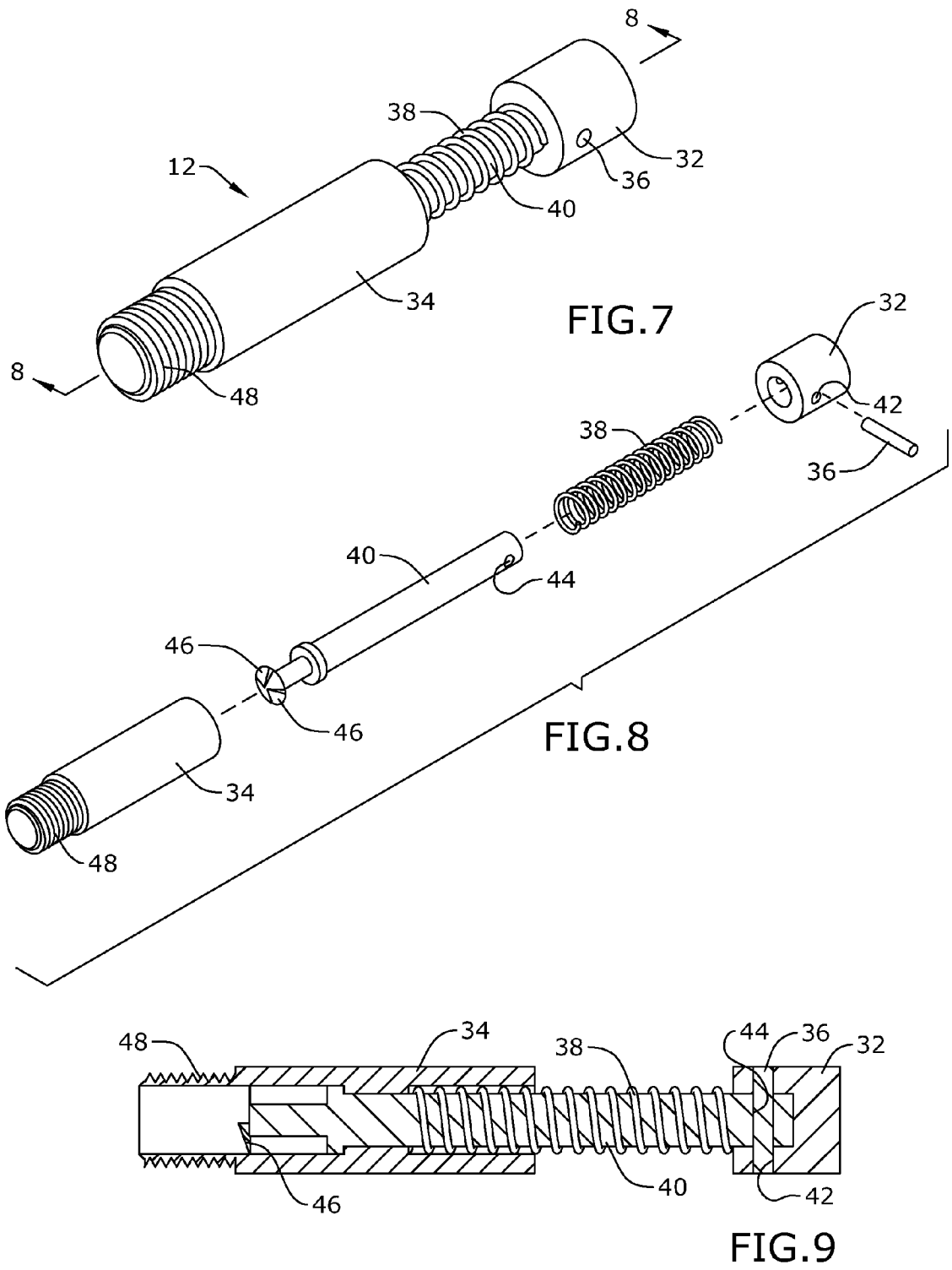

GASKET REMOVAL AND INSERTION TOOLS FOR REFRIGERATION HOSES

RELATED APPLICATION

This application claims priority to provisional patent application U.S. Ser. No. 62/017,360 filed on Jun. 26, 2014, the entire contents of which is herein incorporated by reference.

BACKGROUND

The embodiments herein relate generally to tools, and more particularly, to a tool set including a gasket removal and insertion tool for refrigeration hoses.

Manual extraction of gaskets out of refrigeration hoses and manual insertion of gaskets into such hoses can result in errors and damage. Conventionally, there are no tools designed to aid with this task.

Therefore, what is needed is tool set including a gasket removal and insertion tool for refrigeration hoses.

SUMMARY

Some embodiments of the present disclosure include a tool set for the installation and removal of a gasket from a hose. The tool set may include a gasket insertion tool configured to install a gasket on a hose, the gasket insertion tool being self-centering and having a plunger foot configured to install the gasket onto the hose. The tool set may also include a gasket removal tool configured to remove a gasket from a hose, the gasket removal tool being self-centering and including at least one blade configured to grab onto the gasket to remove the gasket from the hose.

BRIEF DESCRIPTION OF THE FIGURES

The detailed description of some embodiments of the invention is made below with reference to the accompanying figures, wherein like numerals represent corresponding parts of the figures.

FIG. 1 is a perspective view of one embodiment of a gasket insertion tool of the present disclosure.

FIG. 2 is an exploded view of one embodiment of the gasket insertion tool of the present disclosure.

FIG. 3 is a section view of one embodiment of the gasket insertion tool of the present disclosure, taken along line 3-3 in FIG. 1.

FIG. 7 is a perspective view of one embodiment of the gasket removal tool of the present disclosure.

FIG. 8 is an exploded view of one embodiment of the gasket removal tool of the present disclosure.

FIG. 9 is a section view of one embodiment of the gasket removal tool of the present disclosure, taken along line 8-8 in FIG. 7.

DETAILED DESCRIPTION OF CERTAIN EMBODIMENTS

Figure 4:
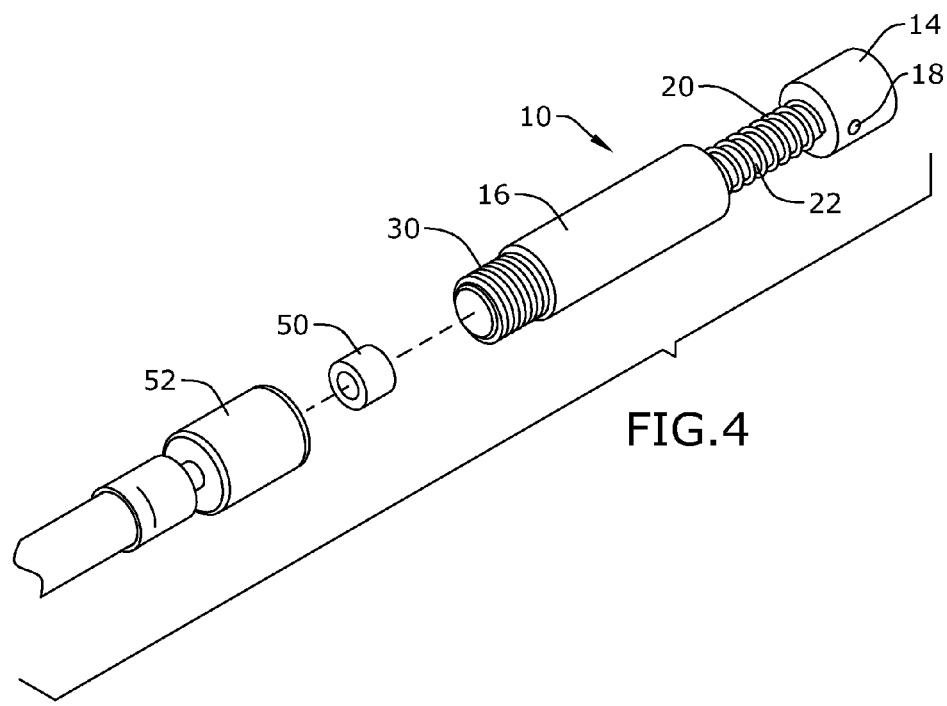
FIG. 4 is an exploded view of one embodiment of the gasket insertion tool of the present disclosure.
Figure 5:
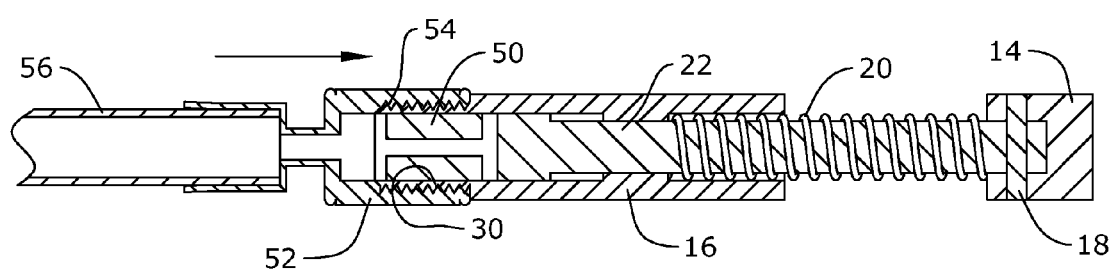
FIG. 5 is a section view of one embodiment of the gasket insertion tool of the present disclosure.

In the following detailed description of the invention, numerous details, examples, and embodiments of the invention are described. However, it will be clear and apparent to one skilled in the art that the invention is not limited to the embodiments set forth and that the invention can be adapted for any of several applications.

The tool set of the present disclosure may be used to remove a gasket from a refrigeration hose and insert a gasket into a refrigeration hose and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

1. Gasket Insertion Tool
2. Gasket Removal Tool

The various elements of the tool set for gasket removal and insertion into refrigeration hoses of the present disclosure may be related in the following exemplary fashion. It is not intended to limit the scope or nature of the relationships between the various elements and the following examples are presented as illustrative examples only.

By way of example, and referring to FIGS. 1-12, some embodiments of the tool set of the present disclosure comprise a gasket insertion tool 10 configured to insert a gasket 50 into a hose coupling 52 attached to a refrigeration hose 56 and a gasket removal tool 12 configured to remove a gasket 50 from a hose coupling 52 attached to a refrigeration hose 56.

As shown in FIGS. 1-6, the gasket insertion tool 10 may comprise a substantially cylindrical, hollowed out insertion barrel 16 having a threaded end 30 extending from a first end thereof, the threaded end 30 not being sealed, but rather having an unsealed end surface, and a plunger 22 extending from a second end thereof, the plunger 22 configured to move back and forth within the insertion barrel 16, wherein the plunger 22 comprises a first end with a plunger foot 28 slidably secured within the insertion barrel 28, the plunger foot 28 having a larger diameter than the rest of the plunger 22. The plunger foot 28 may be configured to slide from an area proximal to a center portion of the insertion barrel's 16 length towards the threaded end 30. The plunger 22 may be prevented from being completely removed from the insertion barrel 16 by a lip on the interior of the barrel 16, causing a portion of the interior of the barrel 16 to have a diameter smaller than the foot 28, but larger than the plunger 22, as shown in FIG. 3. A spring 20 may be positioned around the plunger 22 and may extend from an area proximal to the lip in the barrel 16 to a position proximal to a cap 14 attached to the end of the plunger 22 distal from the plunger foot 28. The cap 14 may be secured to the plunger 22 via a roll pin 18 configured to extend through a pair of cap pin holes 24 and a plunger pin channel 26 in the plunger 22.

Figure 6:
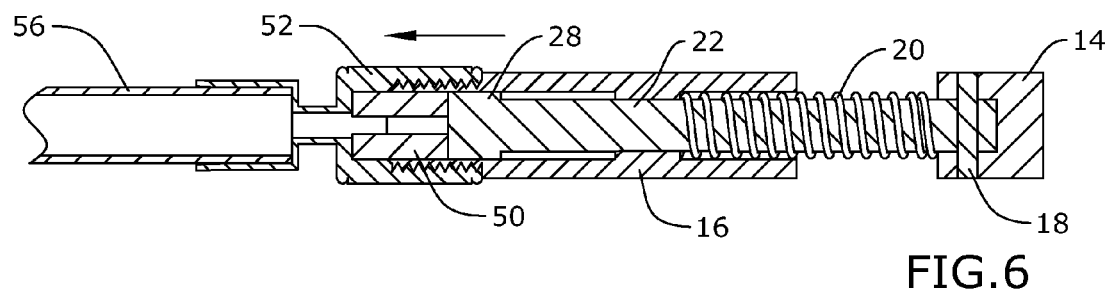
FIG. 6 is a section view of one embodiment of the gasket insertion tool of the present disclosure.

As shown in FIG. 4, the threaded end 30 of the insertion barrel 16 may be configured to engage with hose coupling threads 54 in a hose coupling 52 on a hose 56, such as a refrigeration hose. A gasket 50 may be positioned between the threaded end 20 and the hose coupling 52 such that, when the threaded end 30 is engage with the hose coupling threads 54, the gasket 50 is at least partially enveloped by the threaded end 30. A user may then put force on the cap 14 and, thus, the plunger 20, causing the spring 20 to compress and, as a result, causing the plunger foot 28 to install the gasket 50 onto hose fitting of the hose 56, as shown in FIG. 6.

As shown in FIGS. 7-12, the gasket removal tool 12 may comprise a removal barrel 34 having a threaded end 48 extending from a first end thereof, the threaded end 48 not being sealed, but rather having an unsealed end surface, and a cutter 40 extending from a second end thereof, the cutter 40 being configured to move back and forth and rotate within the removal barrel 34, wherein the cutter 40 comprises a first end having at least one blade 46, such as one, two, or more blades 42, being slidably secured within the removal barrel 34. The cutter 40 may have a lip positioned proximal to the first end 46, wherein the lip has a larger diameter than the rest of the cutter 40. The cutter 40 may be prevented from being completely removed from the removal barrel 34 by a lip on the interior of the barrel 34, causing a portion of the interior of the barrel 34 to have a diameter smaller than the lip on the cutter 40, but larger than the remainder of the cutter 40, as shown in FIG. 9. The first end of the cutter 40 with the blades 46 may be configured to slide from an area proximal to a center portion of the removal barrel's 34 length towards the threaded end 48. A spring 38 may be positioned around the cutter 40 and may extend from an area proximal to the lip in the barrel 34 to a position proximal to a cap 32 attached to the end of the cutter 40 distal from the blades 46. The cap 32 may be secured to the cutter 40 via a roll pin 36 configured to extend through a pair of cap pin holes 42 and a cutter pin channel 44 in the cutter 40. Thus, the gasket removal tool 12 may have a structure similar to the gasket insertion tool 10 other than the bladed end 46 replacing the plunger foot 28.

Figure 10:
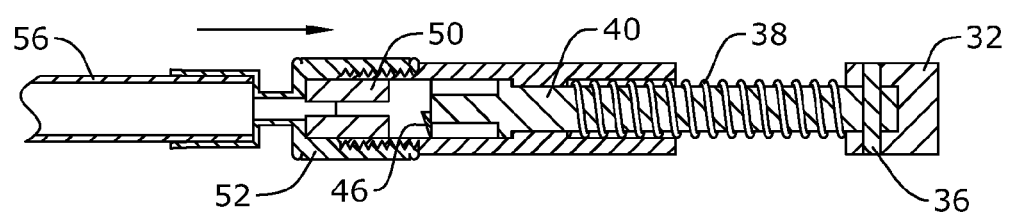
FIG. 10 is a section view of one embodiment of the gasket removal tool of the present disclosure.
Figure 11:
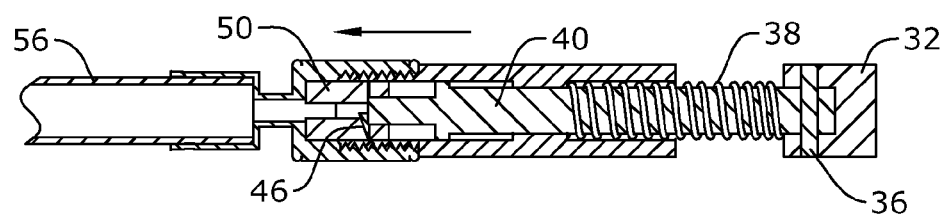
FIG. 11 is a section view of one embodiment of the gasket removal tool of the present disclosure.
Figure 12:
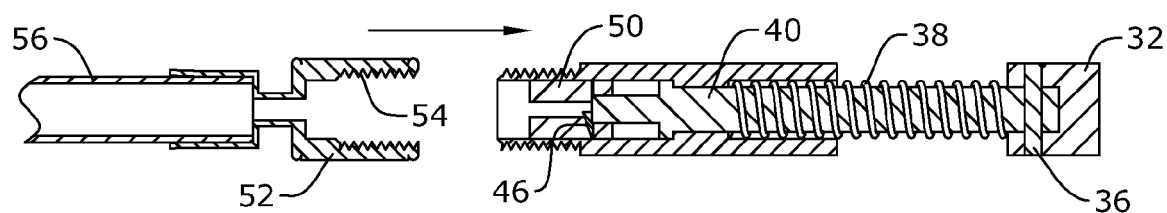
FIG. 12 is a section view of one embodiment of the gasket removal tool of the present disclosure.

As shown in FIGS. 10-12, the threaded end 48 of the removal barrel 34 may be configured to engage with hose coupling threads 54 in a hose coupling 52 on a hose 56, such as a refrigeration hose, wherein a gasket 50 has been previously attaching to the hose 56. When the threaded end 48 is engaged with the hose coupling threads 54, the gasket 50 may be at least partially enveloped by the threaded end 48. A user may then put force on the cap 32 and, thus, the cutter 40, causing the spring 38 to compress and, as a result, causing the blade 46 to grab onto the gasket 50. A user may additionally rotate the cutter 40 if necessary to cause the blade 46 to sufficiently grab onto the gasket 50. The user may then stop placing pressure on the cap 32 or pull the cap 32 away from the removal barrel 34 to remove the gasket 50 from the hose 56. Thus, the old gasket 50 may be removed using a simple push and twist motion, eliminating the need for a user to dig out the old gasket 50, which sometimes get stuck in place. The removal tool 12 may thus reduce the time required to remove gaskets 50 from hoses 56, such as refrigeration hoses.

Both the gasket insertion tool 10 and the gasket removal tool 12 may be self-centering into the hose fitting of a refrigeration hose. The tools 10, 12 may reduce the time required to install and remove a gasket, respectively, and may avoid any error typically caused by the manual insertion and removal of gaskets by correcting aligning and seating the gasket in the hose.

The tools of the present disclosure may be made using any common or desired machining tools, such as milling and drillings, lathes, and the like. The tools may be sized to be used with different sized hosing and, in some embodiments, may be sized and used for gasket insertion and removal for ¼ inch refrigeration hoses.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A gasket insertion tool configured to install a gasket on a hose, the gasket insertion tool comprising:
   a hollow insertion barrel having an unsealed threaded end configured to accommodate a gasket and configured to engage with threads on a hose coupling;
   a plunger extending from an end of the hollow insertion barrel distal from the threaded end, the plunger configured to slide along a length of the hollow insertion barrel within the hollow insertion barrel;
   an interior of the hollow insertion barrel comprises a lip configured to prevent the plunger foot from being removed from the interior of the hollow insertion barrel;
   a spring positioned around the plunger and extending from an area proximal to the lip to a position proximal to an end of the plunger distal from the plunger foot; and
   a cap attached to the distal end of the plunger, the cap being configured to prevent the spring from sliding off of the plunger; wherein
   the plunger comprises a plunger foot slidably secured within the hollow insertion barrel; and the plunger foot is configured to slide from an area proximal to a center portion of the insertion barrel's length towards the threaded end, placing pressure on the gasket and forcing the gasket onto the hose; wherein
   the cap is secured to the plunger via a roll pin extending through a pair of cap pin holes and a plunger pin channel in the plunger.

2. A gasket removal tool configured to remove a gasket from a hose, the gasket removal tool comprising:
   a removal barrel having an unsealed threaded end configured to accommodate a gasket and engage with threads on a hose coupling;
   a cutter extending from an end of the removal barrel distal from the threaded end, the cutter configured to slide along a length of the removal barrel within the removal barrel;
   at least one blade positioned at an end of the cutter proximal to the threaded end, the blade being configured to grab onto the gasket to remove the gasket from the hose; and
   a spring positioned around the cutter and extending from an area proximal to a lip in an interior of the removal barrel to a position proximal to an end of the cutter distal from the at least one blade.

3. The gasket removal tool of claim 2, further comprising a cap attached to the distal end of the cutter, the cap being configured to prevent the spring from sliding off of the cutter.

4. The gasket removal tool of claim 3, wherein the cap is secured to the cutter via a roll pin extending through a pair of cap pin holes and a cutter pin channel in the cutter.

* * * * *